US007526848B2

(12) United States Patent
Lindbo

(10) Patent No.: US 7,526,848 B2
(45) Date of Patent: May 5, 2009

(54) PROCESS FOR VERTICALLY EXTRACTING DIFFUSERS FROM A WASTEWATER TREATMENT TANK

(76) Inventor: Glen D. Lindbo, 3108 Kaloaluiki St., Honolulu, HI (US) 96822

( * ) Notice: Subject to any disclaimer, the term of this patent is extended or adjusted under 35 U.S.C. 154(b) by 272 days.

(21) Appl. No.: 11/481,694

(22) Filed: Jul. 6, 2006

(65) Prior Publication Data

US 2006/0248720 A1 Nov. 9, 2006

Related U.S. Application Data

(62) Division of application No. 10/778,784, filed on Feb. 13, 2004, now Pat. No. 7,069,655.

(60) Provisional application No. 60/447,588, filed on Feb. 14, 2003.

(51) Int. Cl.
*B23P 19/00* (2006.01)
*B21D 51/16* (2006.01)

(52) U.S. Cl. .................................. 29/426.5; 29/890.09

(58) Field of Classification Search ................ 29/426.5, 29/890.09, 235, 426.1; 261/124, 121.1; 210/220, 210/237, 199
See application file for complete search history.

(56) References Cited

U.S. PATENT DOCUMENTS 2,650,810 A * 9/1953 Nordell .................. 261/121.1
5,587,114 A * 12/1996 Tharp ........................ 261/124

* cited by examiner

*Primary Examiner*—John C Hong
(74) *Attorney, Agent, or Firm*—Martin E. Hsia

(57) ABSTRACT

A device and process for vertically extracting diffusers from a wastewater treatment tank where the diffusers are attached to a device having a lifting point and a pivot extraction point. The device and diffusers are lifted from the bottom of the tank until there is a clearance between the diffusers and the bottom of the tank, and then a pulling member attached to the pivot extraction point is pulled to pivot the device and the diffusers to align the diffusers with the hole. The diffusers and the device can then be extracted vertically through the hole.

3 Claims, 4 Drawing Sheets

PROCESS FOR VERTICALLY EXTRACTING DIFFUSERS FROM A WASTEWATER TREATMENT TANK

This application is a divisional of application Ser. No. 10/778784, filed Feb. 13, 2004, issued Jul. 4, 2006, as U.S. Pat. No. 7,069,655, which claimed the priority of provisional patent application 60/447,588, filed Feb. 14, 2003.

TECHNICAL FIELD

This invention relates to a device and process for vertically extracting diffusers from a wastewater treatment tank.

Wastewater treatment facilities are very important to society as described in the inventor's previously issued U.S. Pat. Nos. 6,303,026 and 6,423,214, both of which are incorporated herein by reference. Wastewater is usually treated by a combination of biological and mechanical processes. The biological processes usually include digestion by bacteria and other microorganisms, and the mechanical processes usually include settling and decanting. The biological processes are usually carried out by bacteria that breathe air (aerobic) and also by bacteria that do not breathe air (anaerobic). Because wastewater treatment facilities often generate offensive odors, and can be unsightly, it is desirable to locate them underground or in enclosed areas. Although treatment with aerobic bacteria in open ponds or lagoons is quite common, it is typically used for wastewater treatment facilities for municipalities and other larger wastewater systems. Such open pond or lagoon systems are not practical for smaller dispersed wastewater treatment facilities, especially if those facilities are placed in the middle of urban areas. Thus, aerobic processing of wastewater often is carried out in enclosed tanks that are buried or otherwise concealed from sight. However, because aerobic bacteria need sufficient air to digest the biological materials in wastewater, it is necessary to provide air in such enclosed tanks. The air is usually provided to the bacteria by installing diffusers that bubble air up from the bottom of the tank to the top. However, diffusers need periodic maintenance and servicing (including repair). For example, many diffusers generate air bubbles by forcing air through a perforated membrane or other porous material. The perforations or pores in the membrane or material will become clogged after a certain amount of use, so that they will need to be replaced periodically.

BACKGROUND ART

A diffuser assembly commonly contains a main body having an air intake port and at least one air exhaust port. A diffuser is then attached to each air exhaust port so that air fed through the air intake port exits out the air exhaust port into the diffuser and then generates bubbles by passing through the perforated membrane or porous material of the diffuser. Because air is less dense than water, the diffuser assembly is usually buoyant when filled with air, so that a ballast member can be attached to the main body in order to cause the diffusers to sink to the bottom of the tank so that the largest volume of water in the tank can be aerated.

If the diffusers are at the bottom of the tank and need service (including repair) or maintenance, the tank will need to be drained so that maintenance workers can gain access to the diffusers. This can be quite hazardous because of the presence of noxious fumes in the tank. Further, it takes time to drain and refill the tank, which makes the tank inoperable during draining, maintenance and servicing, and refilling. Because the tanks are often underground and because the tanks contain wastewater, openings for access into the interior of the tank are often placed on the top, above the water level. If the openings were below the water level, then wastewater may leak out of the tank through the opening, and the tank would need to be drained at least below the level of such an opening in order to service and maintain the diffusers.

Diffusers are typically elongated and narrow in order to increase the area through which air is being diffused. If more diffusers are necessary, then additional elongated diffusers are normally added parallel to and spaced apart from other diffusers.

It is therefore desirable to be able to service and maintain diffusers that are in the bottom of a wastewater treatment tank without needing to drain and refill the tank. It is also desirable to be able to perform such servicing and maintenance using only a small opening in the top of the tank, above the water level.

DISCLOSURE OF INVENTION

This invention is a device and process that allows for vertically extracting diffusers from a wastewater treatment tank. The device of this invention includes a body having an air intake port, at least one exhaust port, and a lifting point. A rope, chain, or other lifting member can be attached to the lifting point in order to lift the body off the floor of the tank. A pivot extraction point is also provided, either on the body or on a ballast member attached to the body, so that when the body (and any attached ballast member) is lifted by the lifting point, pulling on the pivot extraction point pivots the body (and any attached ballast member). In this manner, when diffusers are attached to the air exhaust ports, the body and diffusers (and any attached ballast member) can be lifted by the lifting point above the floor of the tank, and then the pivot extraction point can be pulled to pivot the body and the diffusers (and any attached ballast member) until at least one diffuser is aligned with the small opening. The diffuser (and preferably also any other diffusers, the body and any attached ballast member) can then be extracted through the small opening for service and maintenance. The ballast plate can be integrally formed with body and the pivot extraction point can be placed on the body as well.

Of course, the body and diffusers (and any attached ballast member) must be lifted above the floor high enough so that there is enough clearance for the diffusers to clear the floor when the body and diffusers (and any attached ballast member) are pivoted. It is preferred that the lifting member be permanently attached to the lifting point, but that the pulling member not be attached to the pivot extraction point until the device is ready for servicing or maintenance.

Thus, the process of this invention comprises lifting the body and the diffusers by lifting the lifting member (and thus lifting the body by the lifting point) until the body and the diffusers are adjacent to the small hole. A pulling member then can be attached to the pivot extraction point on the body. The body and the diffusers then can be lowered into the tank until the body is at least high enough above the floor that the diffusers will clear the floor when they are pivoted to the vertical position (a clearance height). Pulling the pulling member then pulls on the pivot extraction point so that the body pivots and at least one diffuser becomes aligned with the small hole (obviously, the body and the diffusers must be small enough that they can be pivoted inside the tank). The diffuser then can be extracted through the small hole.

In this manner, the diffusers can be removed for maintenance and repair without draining the wastewater tank, even though the only access to the interior of the wastewater tank is through a small hole on the top. This also reduces the amount of time necessary to service the tank by avoiding the time for draining and refilling the tank. It is also safer than entering into the tank.

Other objects, features and advantages of the present invention will become more fully apparent from the following detailed description of the presently preferred embodiments for carrying out the invention and the accompanying drawings.

BRIEF DESCRIPTION OF DRAWINGS

FIG. 3(*b*) is a side elevational cutaway view of the embodiment of FIG. 1, lifted near the top of the tank with the air hose disconnected and a pulling member attached to the pivot extraction point.

FIG. 3(*c*) is a side elevational cutaway view of the embodiment of FIG. 1, lowered but retaining a clearance for pivoting, and where a diffuser has been aligned with the small hole and can be extracted from the tank for maintenance or servicing.

BEST MODES FOR CARRYING OUT INVENTION

Figure 1:
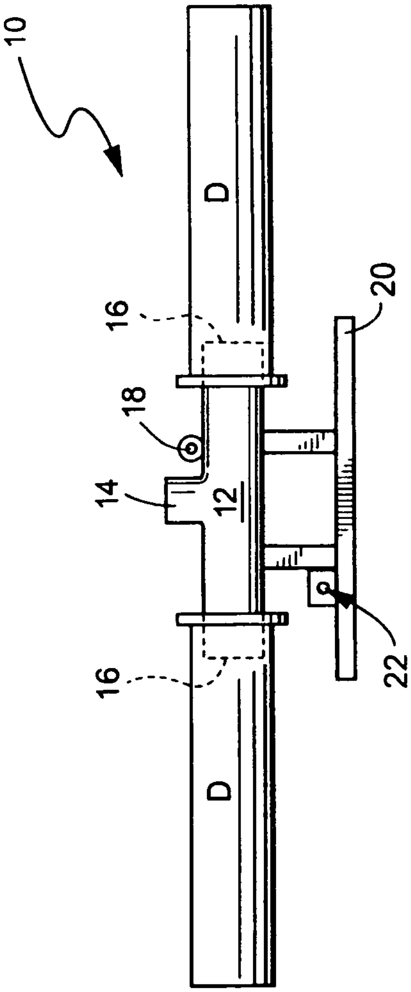
FIG. 1 is a side elevational view from the right side of a preferred embodiment of the present invention having two diffusers.
Figure 2:
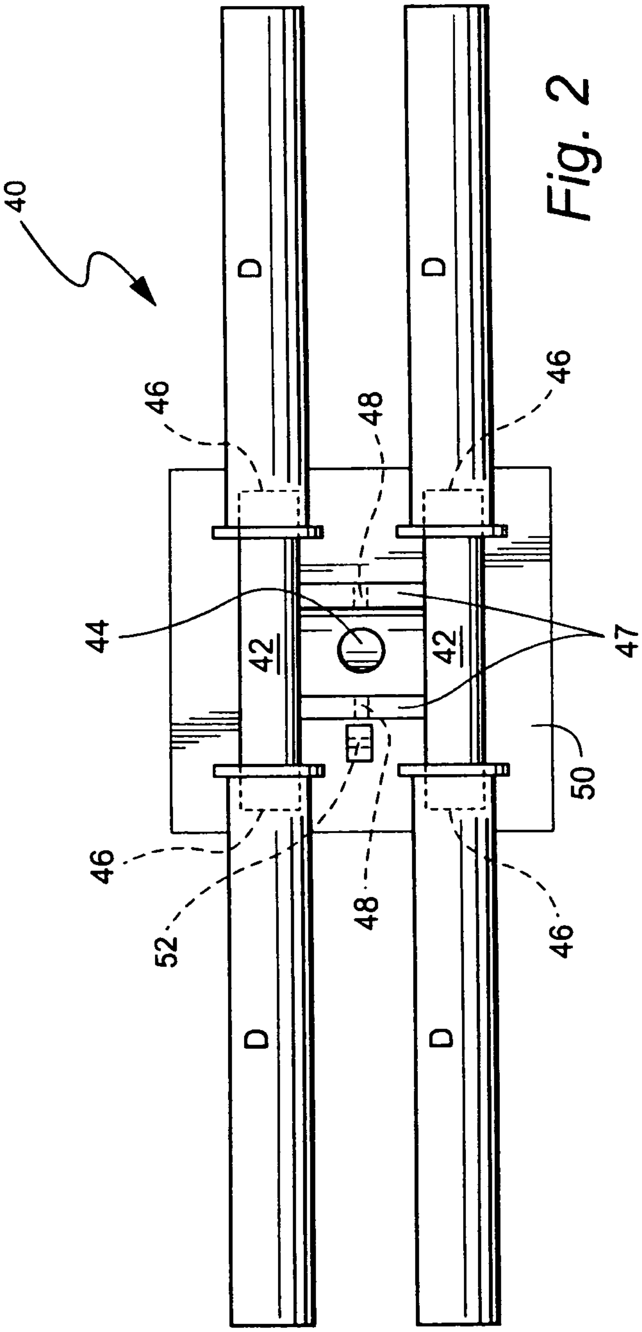
FIG. 2 is a top plan view of an alternative preferred embodiment of the present invention having four diffusers.
Figure 3A:
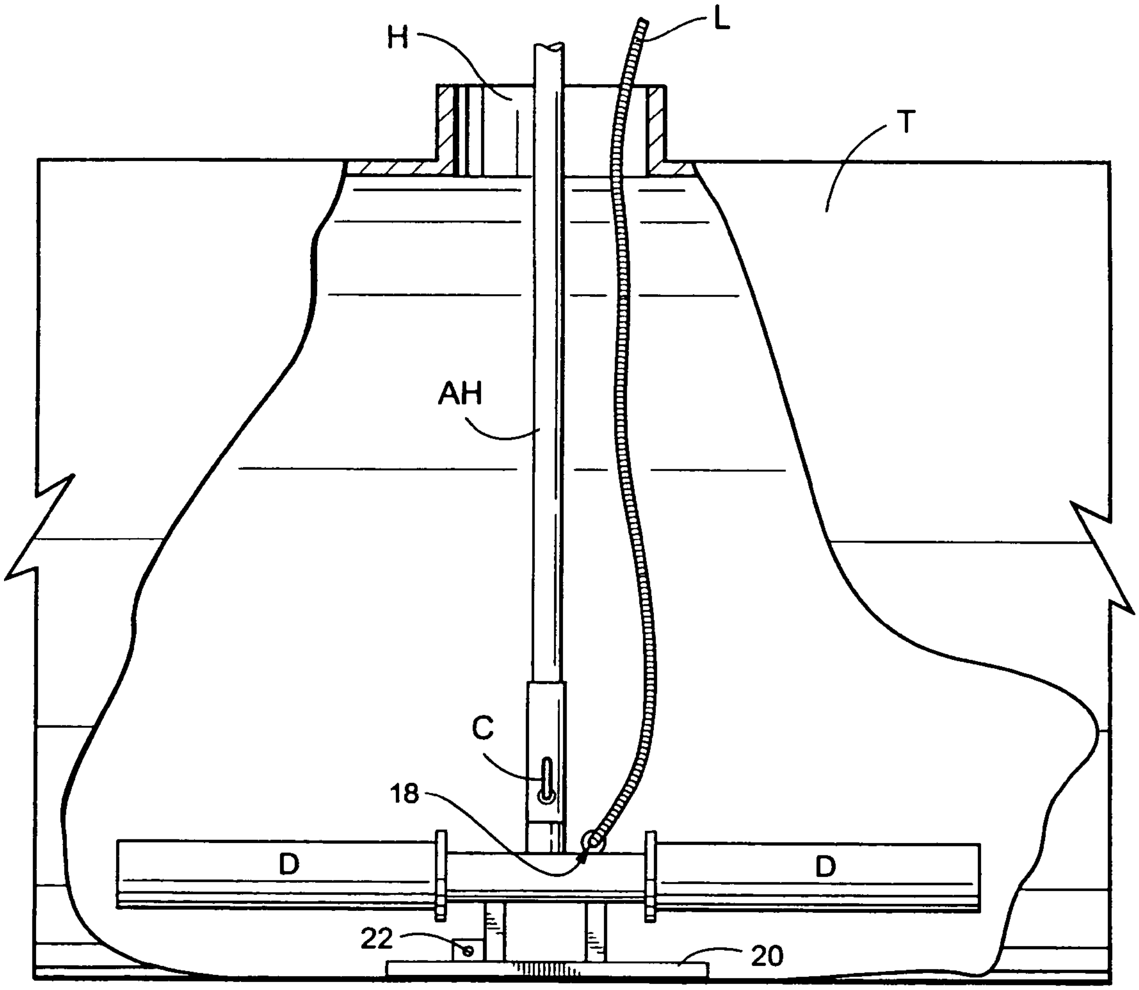
FIG. 3(*a*) is a side elevational cutaway view of the embodiment of FIG. 1 at the bottom of a tank, with an air hose connected and a lifting member attached to the lifting point.
Figure 3B:
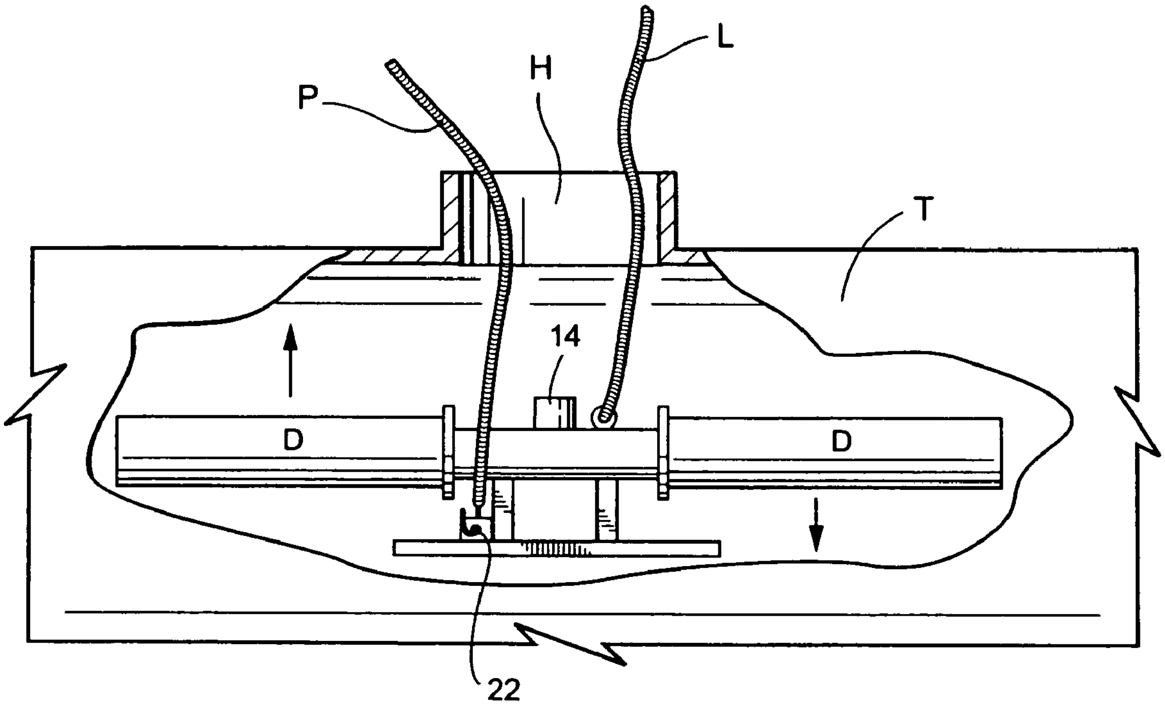
Figure 3C:
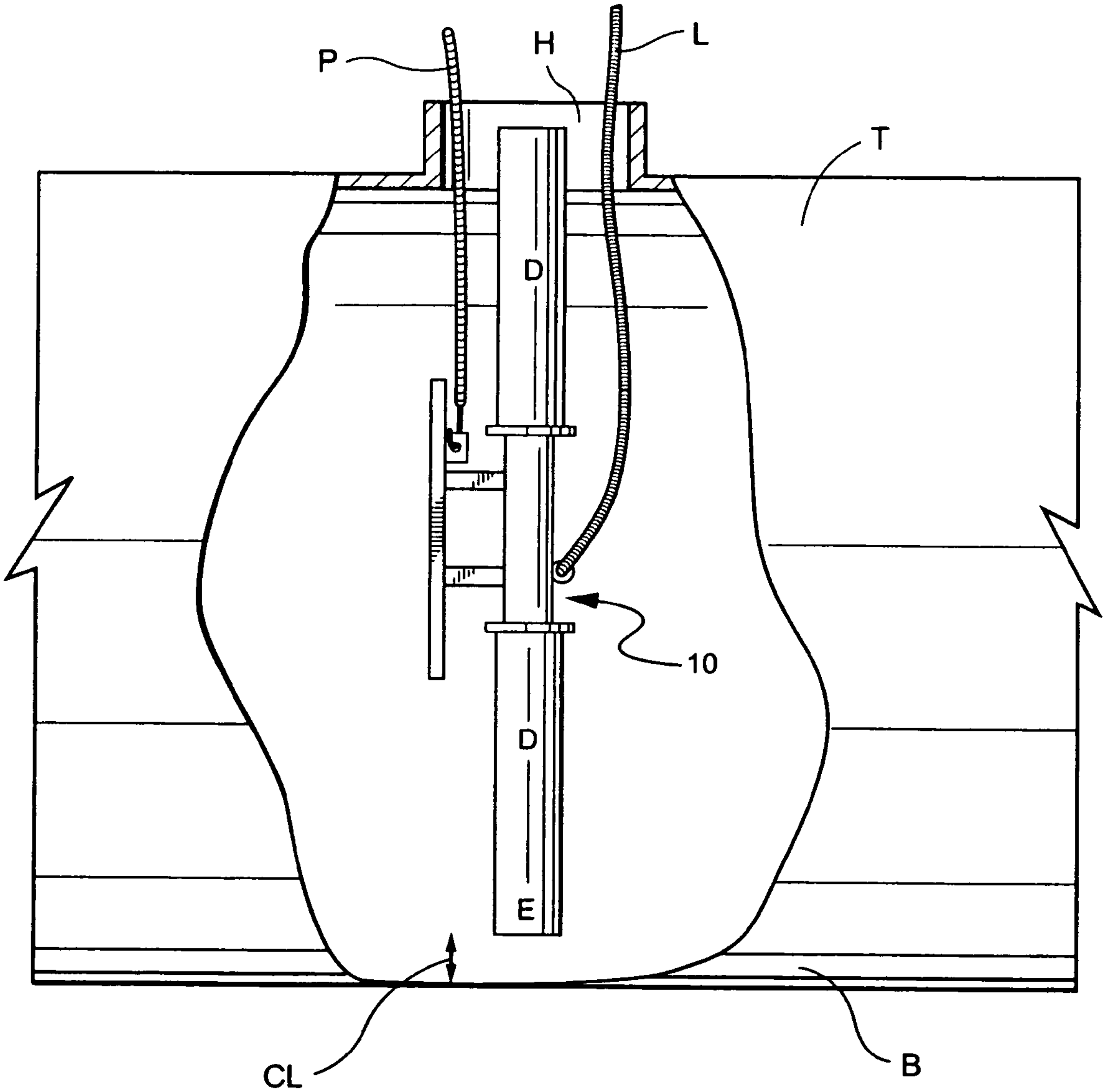

The presently preferred best modes for carrying out the present invention are illustrated by way of example in FIGS. 1 through 3(*c*).

Referring to FIG. 1, shown is a first preferred embodiment of the device 10 comprising a body 12 having an air intake port 14 and two exhaust ports 16. A lifting point 18 is also provided on the body 12. Diffusers D are attached to each of the exhaust ports. Preferably, a ballast plate 20 having a pivot extraction point 22 is attached to the body 12. A pivot attachment ring can be attached to the pivot extraction point.

Referring to FIG. 2, shown is an alternative embodiment 40 of the present invention having a body 42 with a single air intake port 44 and four exhaust ports 46. Preferably, the body 42 is held together for strength by a bracket 47 underneath the central pipe in which the air intake port 44 is situated. Lifting points 48 (holes for passage of a rope, chain or other lifting member) are provided in the bracket 47 (or alternatively lifting points can be placed on the body 42 or the central pipe) and a ballast plate 50 is attached to the body. Diffusers D are attached to the exhaust ports 46. A pivot extraction point 52 is provided on the ballast plate.

Referring to FIGS. 3(*a*), 3(*b*) and 3(*c*), shown is a process according to the present invention. A device according to FIG. 1, for example, is placed in the bottom of a wastewater treatment tank T having a hole H in the top. The ballast plate 20 maintains the device at the bottom of the tank T. A lifting member, such as a lifting rope L, is attached to the lifting point 18. An air hose AH has been attached to the air intake port (not shown), preferably by a quick release coupling C. The lifting rope L is lifted to raise the entire device, including the diffusers D, near the top of the hole H, as shown in FIG. 3(*b*). The air hose AH has been removed by releasing the quick release coupling C, thus exposing the air intake port 14. A pulling member P, such as a rope with a hook, is then attached to the pivot extraction point 22.

Referring to FIG. 3(*c*), the device 10 is lowered back into the tank T enough so that there is clearance CL between the end E of the diffuser D and the bottom of the tank B so that the diffuser can be rotated into substantially vertical position by pulling on the pulling member P, while the device also is being lifted by the lifting member L. In this manner, one diffuser D becomes aligned with the hole H and the diffusers D and the device 10 can then be easily extracted vertically through the hole H by pulling both the lifting member L and the pulling member P.

Of course, instead of lifting on the lifting member L, the device 10 and diffusers D can be lifted towards the hole H by pulling on the air hose AH if the air hose AH has a portion near the hole H.

After the diffusers D have been serviced or maintained, it is a simple matter to quickly and easily replace the device 10 and diffusers D in the bottom of the tank merely by reversing the above steps. Thus, servicing and maintenance of the diffusers D has been achieved quickly and easily without draining the tank T, thus saving time and, therefore, money.

While the present invention has been disclosed in connection with the presently preferred embodiments described herein, it should be understood that there may be other embodiments which fall within the spirit and scope of the invention as defined by the claims. For example, this invention can be practiced with various different configurations and types of diffusers, as long as they fit through the hole H in the tank T. Also, various means of attachment to the pivot extraction point and the lifting point can be used, including tying rope around parts of the body. Accordingly, no limitations shall be implied or inferred in this invention except as specifically and explicitly set forth in the claims

What is claimed is:

1. A process for extracting a diffuser attached to a body through a small opening in the top of a tank having a floor, comprising:

providing a diffuser attached to a body, said body having a lifting point and a pivot extraction point on said body;

lifting said body and said diffuser by said lifting point until said body and said diffuser are adjacent to said small hole;

attaching a pulling member to said pivot extraction point, whereby pulling on said pivot extraction point pivots said body and said diffuser;

lowering said body and said diffuser into said tank until said body is at least a clearance height above said floor;

pulling said pulling member to pull on said pivot extraction point, whereby said body pivots so that said diffuser is aligned with said small hole; and extracting said diffuser through said small hole.

2. A process according to claim 1, wherein said attaching step is performed using a pulling member selected from the group consisting of rope and chain.

3. A process for extracting a diffuser attached to a body through a small opening in the top of a tank having a floor, comprising:

providing a diffuser attached to a body, said body having a lifting point and a pivot extraction point on said body;

lifting said body and said diffuser by said lifting point until said body and said diffuser are adjacent to said small hole;

attaching a pulling member to said pivot extraction point, whereby pulling on said pivot extraction point pivots said body and said diffuser;

lowering said body and said diffuser into said tank until said body is at least a clearance height above said floor;

aligning said diffuser with said small hole;

pulling on said pulling member and lifting said body to extract said diffuser through said small hole.

* * * * *